United States Patent [19]

Kallmann et al.

[11] 4,031,534
[45] June 21, 1977

[54] NOISE RESISTANT ZONE PENETRATION DETECTION SYSTEM

[75] Inventors: George T. Kallmann, Pacific Palisades; Theodore P. Waddell, Port Hueneme, both of Calif.

[73] Assignee: The United States of America as represented by the Secretary of the Navy, Washington, D.C.

[22] Filed: June 1, 1976

[21] Appl. No.: 691,924

[52] U.S. Cl. .................................. 343/12 MD
[51] Int. Cl.² ................................. G01S 9/04
[58] Field of Search ..................... 343/12 MD

[56] References Cited

UNITED STATES PATENTS

| | | | |
|---|---|---|---|
| 3,168,735 | 2/1965 | Cartwright | 343/12 MD |
| 3,289,204 | 11/1966 | Murray et al. | 343/12 MD X |
| 3,611,373 | 10/1971 | Cartwright | 343/12 MD X |

*Primary Examiner*—T.H. Tubbesing

*Attorney, Agent, or Firm*—Richard S. Sciascia; Joseph M. St.Amand; William W. Cochran, II

[57] ABSTRACT

A system for detecting the existence of a projectile within a penetration zone of a target and providing a score indication for each projectile penetrating that zone. The system utilizes a doppler signal generator, a doppler cycle detector and an intercept detector for indicating penetration. A voltage controlled oscillator in the target area provides signal information for transmission by FM telemetry. The unit for scoring the number of intercepts utilizes an FM telemetry receiver for demodulating the signal information. A hit indicator produces a score indication pulse in a manner which is highly resistant to background noise. A score indication device, controlled by the control pulse, counts the score indications and signifies intercepts by an electromechanical counter, audible signals and/or a light display.

12 Claims, 4 Drawing Figures

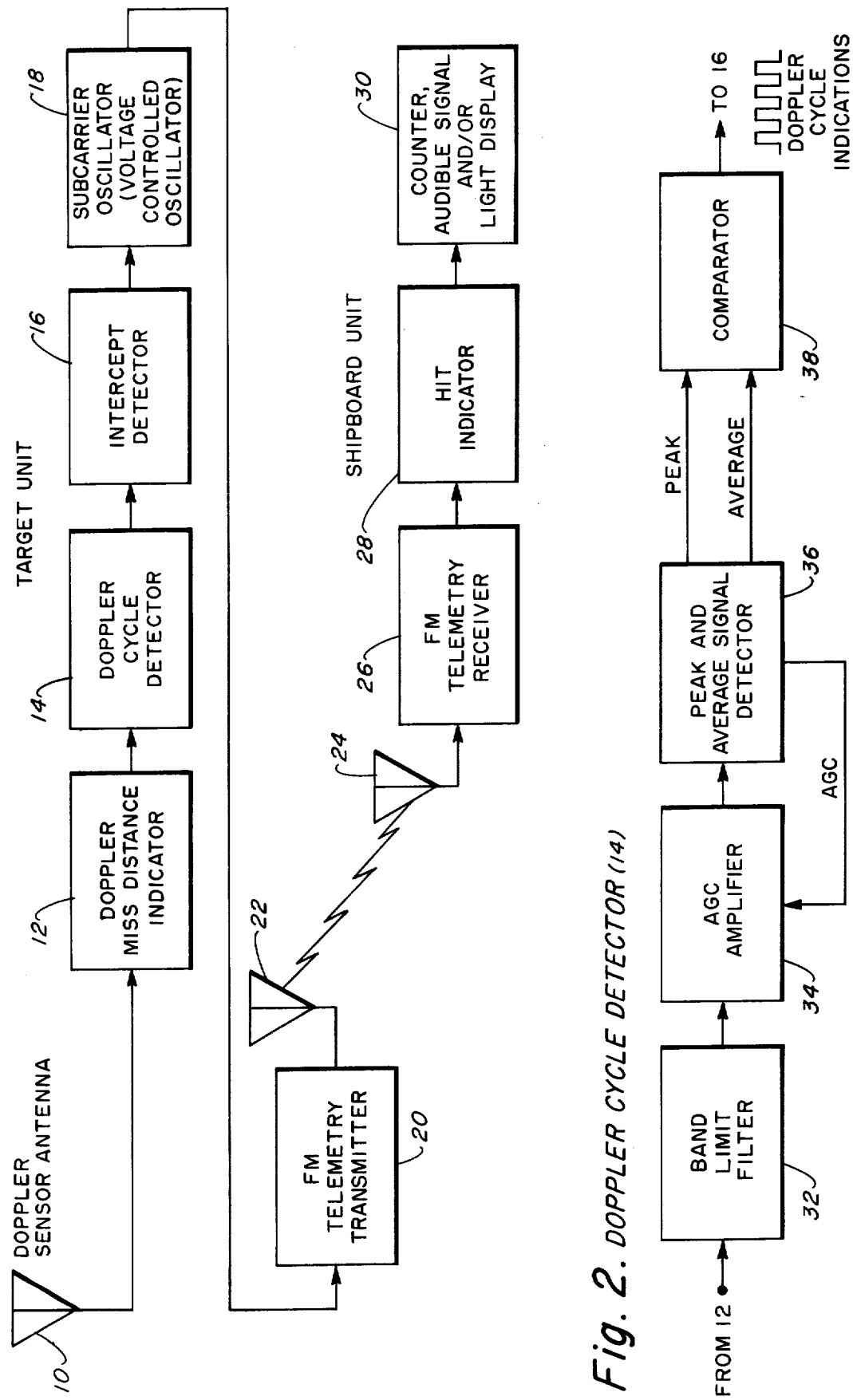

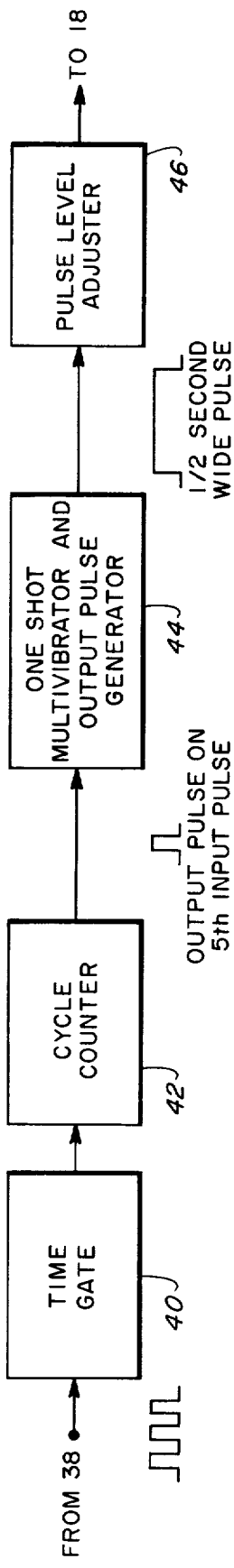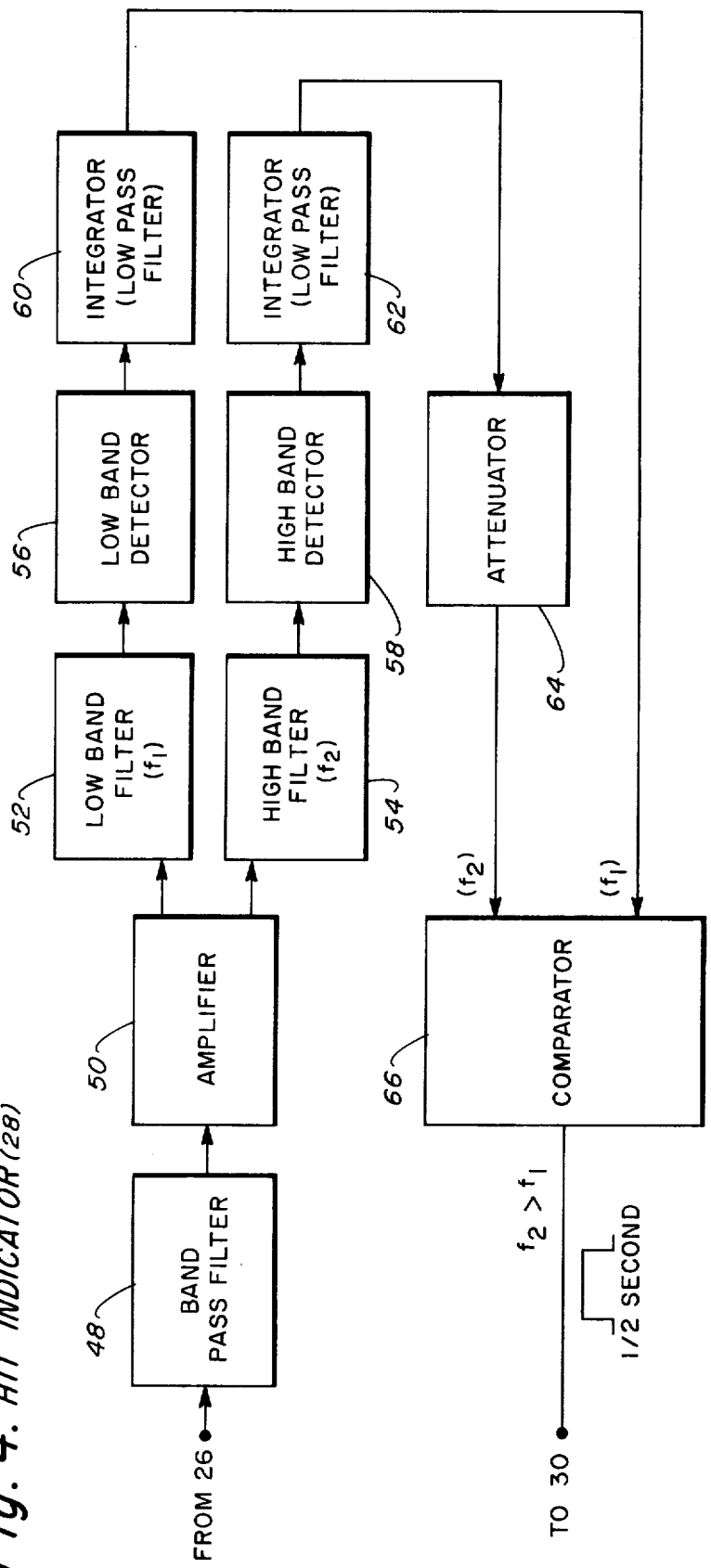

NOISE RESISTANT ZONE PENETRATION DETECTION SYSTEM

BACKGROUND OF THE INVENTION

The present invention pertains generally to target scoring devices and more particularly to a device for communicating an intercept score in a noisy environment. In the testing of both equipment and human skill, it is oftentimes desirable to automatically signal that a shell or projectile has come within the zone of the maximum detection range of a miss distance indicator of a target which is being fired upon. Penetration of the zone is commonly referred to as a score. This situation often occurs in ship gunnery exercises where a ship's crew wishes to determine the number of shells which have penetrated this zone.

Conventional automatic scoring systems have used various methods for detecting scores. A common system has used a doppler detector in which alternating current cycles amounting to heat frequency oscillations are generated by a miss distance indicator and are used to modulate a telemetry transmitter. The telemetry signal is, in turn, received by a receiving station on board the ship and demodulated so that the beat frequency oscillations can be detected. The oscillations generally range in a frequency from a few Hertz up to as much as 25 kiloHertz. The oscillations are then fed through a detection system which detects the presence of the oscillations above a certain threshold frequency. A counter is then used to count these oscillations above this threshold frequency to discriminate against noise and thereafter register a score.

In practice this system has presented various disadvantages and limitations in the presence of environmental and radio frequency noise. For example, in a case where the receiving antenna of a scoring indication unit is located proximate various radar transmitting antennas and other forms of RF interference, false score indications are prevalent. In this case and in the loss of the telemetry carrier, the automatic scoring device at the receiving station cannot effectively distinguish between the desired signal and the noise. The system, in general, has therefore not shown the reliability required to properly evaluate the functions being tested.

SUMMARY OF THE INVENTION

The present invention overcomes disadvantages and limitations of the prior art by providing a noise resistant zone penetration detection system. The system of the present invention transfers the hit detection function, data processing and the decision process from the ship to the target area so that the score indication data can be transmitted over a signal having a very narrow band width to effectively distinguish it from noise. In addition, a method is utilized for extracting the signal from the noise at the receiving station which requires the signal indication to be a certain percentage above the noise level which greatly reduces false counts. This also prevents false scoring indication when the telementry carrier is lost.

It is therefore an object of the present invention to provide a noise resistant zone penetration detection system.

It is also an object of the present invention to provide a noise resistant zone penetration detection system which prevents a score indication due to loss of telemetry carrier.

Another object of the present invention is to provide a noise resistant zone penetration detection system which is impervious to radio frequency (RF) induced noise.

Another object of the present invention is to provide a noise resistant zone penetration detection system which is reliable in operation.

Another object of the present invention is to provide a noise resistant zone penetration detection system which virtually eliminates false scoring counts.

Other objects and further scope of applicability of the present invention will become apparent from the detailed description given hereinafter. The detailed description indicating the preferred embodiment of the invention is given only by way of illustration since various changes and modifications within the spirit and scope of the invention will become apparent to those skilled in the art from the detailed description. The foregoing abstract of the disclosure is for the purpose of providing a non-legal brief statement to serve as a searching and scanning tool for scientists, engineers and researchers and is not intended to limit the scope of the invention as disclosed herein nor is it intended to be used as interpreting or in any way limiting the scope or fair meaning of the appended claims.

BRIEF DESCRIPTION OF THE DRAWINGS

FIG. 1 is an overall block diagram of the preferred embodiment of the invention.

FIG. 2 is a block diagram of the doppler cycle detector.

FIG. 3 is a block diagram of the intercept indicator.

FIG. 4 is a block diagram of the hit indicator.

DETAILED DESCRIPTION OF THE PREFERRED EMBODIMENT

Fig. 1 discloses a block diagram of the overall system in which the doppler sensor antenna 10, doppler miss distance indicator 12, doppler cycle detector 14, intercept detector 16, sub-carier oscillator 18, FM telemetry transmitter 20, and transmitting antenna 22 are located proximate the target unit. The shipboard unit comprises the antenna 24, the FM telemetry receiver 26, the hit detector 28 and the counter, audible signal and/or light display 30. In operation, the doppler sensor antenna 10 operates as a transmitting/receiving antenna and is connected to the doppler miss distance indicator which produces doppler signal, i.e., beat frequency oscillations whenever the projectile is moving within the range of the doppler antenna signal. The doppler cycle detector 14 produces a series of doppler cycle indications which are fed to the intercept detector 16 which produces a target detection pulse in response to detection of a predetermined number of doppler cycle indications within a predetermined period. The target detection pulse is used to vary the output frequency of the subcarrier oscillator 18 which is modulated and transmitted over the FM telemetry transmitter 20 via antenna 22. This signal is detected by receiving antenna 24 and demodulated at the FM telemetry receiver 26. The hit indicator 28 produces a controlled pulse at its output in response to detection of an intercept. This signal is delivered to the counter, audible signal and/or light display 30.

FIG. 2 is a block diagram of the doppler cycle detector 14 which functions to determine if doppler cycles are present from the doppler miss distance indicator 12. The band limit fitler 32 functions to filter out low and high frequency signals which are known to be outside of the frequency range of expected signals from projectiles. These frequency ranges have been determined from prior knowledge of the operation of the miss distance indicator unit 12, the intercept geometry and target speed and velocity of the projectiles. The band limit filter 32 therefore eliminates a large amount of noise from the information signal. The AGC amplifier 34 adjusts the doppler cycle detector to a standard operating level above ambient noise conditions. By utilizing the AGC circuit, the doppler cycle detector is more adaptable to various signal and noise level conditions, which commonly vary over a wide range.

The peak and average signal detector 36 functions to detect the signal coming from the AGC amplifier 34. It provides two outputs; an average signal output which varies with the time average level of the signal coming from the AGC amplifier, and a peak level signal which follows the individual doppler cycle pulses at the input of the peak and average signal detector 36.

The peak level signal and the average level signal from the peak and average signal detector 36 are fed to the comparator 38. Whenever the peak signal exceeds the average signal by a predetermined amount, the comparator emits a pulse to indicate that a single doppler cycle has been detected. A threshold adjustment can be included in the comparator to vary the amount of signal required to produce an output pulse. This threshold allows the operator to control the rate at which random counts are caused by noise. These doppler cycle indications produced at the output of the comparator 38 are applied to the intercept detector 16 which is shown in FIG. 3.

The intercept detector of FIG. 3 functions to determine whether the doppler cycle indications emitted by the doppler cycle detector constitute a valid intercept. This is determined by counting the number of doppler cycle indications occurring within a given time span. For example, the intercept detector could function to determine whether five counts have occurred within a given time span and, in response, produce an output pulse indicating a valid intercept detection. Of course, the time span and the number of counts can be varied depending upon the particular conditions.

In operation, time gate 40 detects an initial pulse from the doppler cycle indications and passes succeeding doppler cycle indication pulses to the cycle counter 42 for a predetermined period. The time gate 40 has a trigger circuit and a multivibrator causing it to remain in an open condition for a period sufficient to allow the slowest relative intercept velocity signal to pass the predetermined number of required pulses, e.g., five pulses. At higher relative intercept velocities, more than this predetermined number of pulses passes through the time gate. The cycle counter 42 accumulates the number of pulses passed by the time gate 40 and emits an output pulse at the beginning of the final pulse of the predetermined number of pulses, e.g., the fifth pulse. This output pulse is applied to the one-shot multivibrator and output pulse generator 44 which produces a half-second wide pulse in response to the output pulse in the cycle counter 42. The half-second pulse is used so that no more than one scoring indiction can be counted within 1 second. This prevents more than one score being counted for any one projectile while it is in the zone of the doppler miss distance indicator. The pulse level adjuster 46 adjusts the output level of the half-second wide control pulse before being applied to the subcarrier oscillator 18.

The subcarrier oscillator 18 comprises a voltage controlled oscillator which has an output frequency which is deviated in accordance with its input voltage. In the quiescent condition, i.e., when the half-second wide control pulse is not present, the output of the voltage controlled oscillator is at a first predetermined frequency ($f_1$). When the half-second wide control pulse is applied to the voltage controlled oscillator its output shifts to a second predetermined frequency ($f_2$). The voltage controlled oscillator output is used to frequency modulate the FM telemetry transmitter 20. This signal is transmitted via transmitting antenna 22 to the station where the score indication is displayed. The signal is received by receiving antenna 24 and fed to the FM telemetry receiver 26. The FM telemetry receiver 26 functions to demodulate the signal so that it produces the subcarrier signal at its output similar to the subcarrier oscillator signal produced by voltage controlled oscillator 18.

The subcarrier signal is then fed to the hit indicator 28 which produces a control pulse at its output indicating an intercept score. A detailed block diagram of the hit indicator is shown in FIG. 4. The band pass filter 48 functions to eliminate all signals except those within the frequency range of $f_1$ and $f_2$. This eliminates a major portion of the interference noise signals. Amplifier 50 acts to amplify the signals from the band pass filter 48. A pair of sharp filters 52 and 54 are designed to pass only the signals $f_1$ and $f_2$, respectively. These signals are respectively applied to a low band detector 56 and a high band detector 58 which act to produce an output signal whenever a signal is present at the output of filters 52 and 54, respectively. The outputs of detectors 56 and 58 are applied to integrators 60 and 62, respectively, which act as low pass filters having a time consonant of, for example, one fourth of a second. The integrators are designed to prevent the system from triggering on a short duration pulse possibly caused by noise. The one-fourth second time integration period is used as an example since it will allow the system to operate on the one-half second pulse produced by the subcarrier oscillator and will, at the same time, disregard most noise signals. The outputs of the integrators 60 and 62 are then applied to a comparator 66. An attenuator 64 is placed between the integrator 62 and the comparator 66 and is adjusted so that the comparator will receive equal level signals from the $f_1$ and $f_2$ lines, only when the output of the $f_2$ integrator is twice the level of that of the $f_1$ integrator.

The comparator compares the input levels of the $f_1$ and $f_2$ lines and when the level of the $f_2$ line exceeds the level of the $f_1$ line, the comparator emits a one-half second wide pulse which signals the counter, audible signal and/or light display 30 that a valid score has been received. The attenuator 64, in combination with the comparator 66, functions to prevent false counts, i.e., false score indications due to a loss of the carrier, since each channel under those conditions contains approximately equal noise information. In conventional devices, a filter and a detector is used to sense only the $f_2$ signal. Whenever that signal exceeds a predetermined threshold level, an output pulse is produced. Therefore, if the noise level exceeds this threshold a hit indication will register. The present system, unlike conventional systems, will not trigger on noise alone since the information signal must be a certain percentage amount above the noise level. In this manner, the preferred embodiment presents a threshold which varies with the background noise level.

The present system therefore provides an intercept score indication which is highly reliable and extremely resistant to background noise. This is accomplished by shifting the hit indication, data processing and decision process to the target area so that a narrow band FM signal, which is highly resistant to background noise, can be transmitted from the target to the indicating devices. The system prevents false scoring indications, due to the loss of the telemetry carrier or weak signal conditions, by utilizing a hit indicator which is very unresponsive to noise.

Obviously, many modification and variations of the present invention are possible in light of the above teachings. For example, all of the time and count parameters can be varied for different combinations of shell velocity, firing rate, and size of detection zone. It is therefore to be understood that within the scope of the appended claims, the invention may be practiced otherwise than as is specifically described.

What is claimed is:

1. A system for detecting the existence of a projectile within a penetration zone of a target and providing a score indication for each projectile comprising:
   a. doppler miss distance indication means for producing a beat frequency signal whenever said projectile is moving within said penetration zone;
   b. means for producing a target detection pulse having a predetermined pulse width in response to detection of said beat frequency signal within a predetermined frequency range;
   c. means for transmitting from said penetration zone a first FM subcarrier signal having a first predetermined frequency and a second FM subcarrier signal having a second predetermined frequency in response to said target detection pulse;
   d. receiving means for detecting said first and second subcarrier signal; and
   e. display means for providing a score indication for each projectile in response to detection of said second subcarrier signal by said receiving means.

2. The system of claim 1 wherein said receiving means comprises:
   a. an FM telemetry receiver for detecting said first and second subcarrier signals; and
   b. means for producing a hit indication in response to detection of said second subcarrier signal.

3. The system of claim 2 wherein said means for producing a hit indication comprises:
   a. a band pass filter;
   b. means for detecting said first subcarrier signal having said first predetermined frequency;
   c. means for detecting said second subcarrier signal having said second predetermined frequency;
   d. means for attenuating said second subcarrier signal having said second predetermined frequency;
   e. comparator means for producing an output hit indication whenever said first subcarrier signal having said first predetermined frequency is less than said second subcarrier signal having said second predetermined frequency.

4. The system of claim 3 wherein said means for producing a target detection pulse comprises:
   a. doppler cycle detection means for producing a series of doppler cycle indications; and
   b. intercept detection means for producing a target detection pulse having a predetermined pulse width and magnitude in response to detection of a predetermined number of said doppler cycle indications from said doppler cycle detection means.

5. The system of claim 4 wherein said doppler cycle detection means comprises:
   a. means for filtering a predetermined band of frequencies of said beat frequency signal to exclude signals outside the frequency range of signals produced by anticipated projectiles;
   b. means for producing an average level signal and a peak level signal from said predetermined band of frequencies of said beat frequency signal;
   c. means for comparing said average level signal and said peak level signal to produce said series of doppler cycle indications whenever said peak level signal exceeds said average level signal by a predetermined amount.

6. The system of claim 4 wherein said intercept detection means comprising:
   a. gating means for passing said series of doppler cycle indications for a predetermined period upon detection of an initial input pulse from said series of doppler cycle indications;
   b. counter means for producing a gate signal in response to a predetermined number of said doppler cycle indications;
   c. output pulse generating means for producing said target detection pulse.

7. The system of claim 2 wherein said means for producing a target detection pulse comprises:
   a. doppler cycle detection means for producing a series of doppler cycle indications; and
   b. intercept detection means for producing a target detection pulse having a predetermined pulse width and magnitude in response to detection of a predetermined number of said doppler cycle indications from said doppler cycle detection means.

8. The system of claim 7 wherein said doppler cycle detection means comprises:
   a. means for filtering a predetermined band of frequencies of said beat frequency signal to exclude signals outside the frequency range of signals produced by anticipated projectiles;
   b. means for producing an average level signal and a peak level signal from said predetermined band of frequencies of said beat frequency signal;
   c. means for comparing said average level signal and said peak level signal to produce said series of doppler cycle indications whenever said peak level signal exceeds said average level signal by a predetermined amount.

9. The system of claim 7 wherein said intercept detection means comprises:
   a. gating means for passing said series of doppler cycle indications for a predetermined period upon detection of an initial input pulse from said series of doppler cycle indications;
   b. counter means for producing a gate signal in response to a predetermined number of said doppler cycle indications;
   c. output pulse generating means for producing said target detection pulse.

10. The system of claim 1 wherein said means for producing a target detection pulse comprises:
    a. doppler cycle detection means for producing a series of doppler cycle indications; and b. intercept detection means for producing a target detection pulse having a predetermined pulse width and magnitude in response to detection of a predetermined number of said doppler cycle indications from said doppler cycle detection means.

11. The system of claim 10 wherein said doppler cycle detection means comprises:
   a. means for filtering a predetermined band of frequencies of said beat frequency signal to exclude signals outside the frequency range of signals produced by anticipated projectiles;
   b. means for producing an average level signal and a peak level signal from said predetermined band of frequencies of said beat frequency signal;
   c. means for comparing said average level signal and said peak level signal to produce said series of doppler cycle indications whenever said peak level signal exceeds said average level signal by a predetermined amount.

12. The system of claim 10 wherein said intercept detection means comprises:
   a. gating means for passing said series of doppler cycle indications for a predetermined period upon detection of an initial input pulse from said series of doppler cycle indications;
   b. counter means for producing a gate signal in response to a predetermined number of said doppler cycle indications;
   c. output pulse generating means for producing said target detection pulse.

* * * * *